United States Patent
Nowak et al.

[11] Patent Number: 6,141,031
[45] Date of Patent: Oct. 31, 2000

[54] AERIAL COLOR REGISTRATION

[75] Inventors: William J. Nowak, Webster; James J. Appel, Rochester; Edward C. Bock, Macedon, all of N.Y.

[73] Assignee: Xerox Corporation, Stamford, Conn.

[21] Appl. No.: 09/210,188

[22] Filed: Dec. 11, 1998

[51] Int. Cl.$^7$ ........................................ B41J 2/435
[52] U.S. Cl. ............................... 347/236; 347/246
[58] Field of Search .................... 347/236, 235, 347/246, 261; 250/548, 235; 350/486

[56] References Cited

U.S. PATENT DOCUMENTS

| | | | |
|---|---|---|---|
| 4,664,487 | 5/1987 | Tam | 350/486 |
| 5,208,796 | 5/1993 | Wong et al. | 369/97 |
| 5,287,125 | 2/1994 | Appel et al. | 346/108 |
| 5,750,986 | 5/1998 | Genovese | 250/235 |

Primary Examiner—N. Le
Assistant Examiner—Lamson Nguyen
Attorney, Agent, or Firm—John W Kelly

[57] ABSTRACT

Electrophotographic printers having raster output scanners that correct for polygon facet phasing errors and photoreceptor position errors by aerial scan line adjustments. A photoreceptor position sensor senses the position of the photoreceptor and a facet position sensor senses the position of the polygon facets. A scan line position controller produces a position signal that depends upon the photoreceptor position sensor and the facet position sensor. A piezoelectric-actuated lens mover assembly receives the position signal and moves a pre-polygon lens to adjust the scan line plane to correct for any misregistration. The piezoelectric-actuated lens mover assembly includes a large displacement piezoelectric element and a flexible arm assembly that holds the pre-polygon lens.

19 Claims, 6 Drawing Sheets

AERIAL COLOR REGISTRATION

FIELD OF THE INVENTION

This invention relates to electrophotographic color printers that use raster output scanners. In particular, it relates to the registration of color images in a single pass electrophotographic color printer by controlling the scan line positions using the raster output scanners.

BACKGROUND OF THE INVENTION

Electrophotographic marking is a well-known method of copying or printing documents. Electrophotographic marking is performed by exposing a light image representation of a desired final image onto a substantially uniformly charged photoreceptor. In response to that light image the photoreceptor discharges so as to produce an electrostatic latent image of the desired image on the photoreceptor's surface. Toner particles are then deposited onto that latent image so as to form a toner image. That toner image is then transferred from the photoreceptor onto a substrate such as a sheet of paper. The transferred toner image is then fused to the substrate, usually using heat and/or pressure. The surface of the photoreceptor is then cleaned of residual developing material and recharged in preparation for the production of another image.

The foregoing broadly describes a black and white electrophotographic marking machine. Electrophotographic marking can also produce color images by repeating the above process once for each color of toner that is used to make the composite color image. For example, in one color process, called the REaD IOI process (Recharge, Expose, and Develop, Image On Image), a charged photoreceptive surface is exposed to a light image which represents a first color, say black. The resulting electrostatic latent image is then developed with black toner to produce a black toner image. The recharge, expose, and develop process is repeated for a second color, say yellow, then for a third color, say magenta, and finally for a fourth color, say cyan. The various latent images and consequently the color toners are placed in a superimposed registration such that a desired composite color image results. That composite color image is then transferred and fused onto a substrate.

The REaD IOI process can be performed in a various ways. For example, in a single pass printer wherein the composite image is produced in a single pass of the photoreceptor through the machine. This requires a charging, an exposing, and a developing station for each color of toner. Single pass printers are advantageous in that they are relatively fast since a color image is produced during each cycle of the photoreceptor.

One way of exposing the photoreceptor is to use a Raster Output Scanner (ROS). A ROS is comprised of a laser light source (or sources) and a rotating polygon having a plurality of mirrored facets. The light source radiates a laser beam onto the polygon facets. That beam reflects from the facets and strikes the photoreceptor, producing a light spot. As the polygon rotates the spot traces lines, referred to as scan lines, on the photoreceptor. The direction of the sweeping spot is called the fast scan direction. By moving the photoreceptor perpendicular to the fast scan direction, as the polygon rotates the spot raster scans the photoreceptor. The direction of motion of the photoreceptor is referred to either as the slow scan direction or the process direction. During scanning, the laser beam is modulated to produce the desired latent image.

In color electrophotographic printing it is very important that the various color latent images be accurately registered with each other. By registration it is meant that the latent images are produced such that when the various latent images are developed and transferred that the desired composite image results. Latent image misregistration causes color errors that are highly noticeable by the human eye.

Various factors cause misregistration. For example, photoreceptor motion may not be perfect because vibration, motor backlash, gear train interactions, mechanical imbalances, and/or friction, among other factors, can cause the instantaneous position of the photoreceptor to be less than ideal. Another cause of misregistration is polygon facet misplacement, also referred to as phasing errors. Facet misplacement comes about because it is very difficult to accurately synchronize the rotation of the polygon with the motion of the photoreceptor. When the photoreceptor is in the proper position to receive the latent image the polygon facet that should reflect the laser beam might be +Y2 a scan line off. The result is either a delay or an advance of the first scan line of a latent image, which causes the remaining scan lines to be offset.

Misregistration in the fast scan direction is usually reduced by using a start-of-scan sensor in the optical path. That sensor detects when the sweeping spot is at a predetermined location. Using that information the modulation of the laser beam is controlled such that the latent image starts at the correct place on the photoreceptor. However, misregistration in the slow scan direction is harder to control. One approach is to accurately control the photoreceptor's motion. However, because of inertia, backlash, and other mechanical motion problems this is difficult and expensive to do. As previously noted, misregistration caused by phasing errors is also very difficult to control.

Another approach to reducing misregistration is to use "aerial" image control. In aerial image control the scan line itself is adjusted to prevent or reduce misregistration. For example, U.S. Pat. No. 5,287,125 to Appel et al. discloses a raster output scanner that has process direction (slow scan direction) can line position control. In that patent an error feedback circuit senses the position of a moving photoreceptor. Photoreceptor position errors are used to produce signals that are applied to a piezoelectric actuator. The piezoelectric actuator expands or contracts, moving a pre-polygon lens, which moves the scan line produced on the photoreceptor so as to correct for photoreceptor motion errors. Additionally, U.S. Pat. No. 6,023,286 entitled "MOVING MIRROR MOTION QUALITY COMPENSATION," filed on Dec. 31, 1997 by Nowak et al. teaches a mirror moved by a piezoelectric element to correct for photoreceptor motion errors.

While the references cited above are useful, they have their limitations. In U.S. Pat. No. 5,287,125 connecting a pre-polygon lens to the piezoelectric actuator such that the pre-polygon lens accurately tracks rapid expansions and contractions of the actuator, while simultaneously providing accurate positioning of the pre-polygon lens for proper focus, is difficult and expensive. Furthermore, the scan line movers taught in U.S. Pat. No. 5,287,125 and in U.S. Pat. No. 6,023,286 have mechanical factors that limit the rate at which scan line adjustments can be made. This prevents them from being used to correct for phasing errors.

Therefore, a scan line adjustment technique capable of accurately adjusting the scan line position to correct for both photoreceptor position errors and for phasing errors, would be beneficial. Even more beneficial would be such a scan line adjustment technique that can be implemented at relatively low cost.

SUMMARY OF THE INVENTION

The principles of the present invention provide for electrophotographic printers that have raster output scanners that adjust scan line positions to correct for photoreceptor position errors and for polygon facet phasing errors.

An electrophotographic printers according to the present invention includes a moving photoreceptor, a photoreceptor position sensor for determining the position of the photoreceptor, and a raster output scanner that produces a sweeping laser beam in a scan line plane that images a scan line on the photoreceptor. The raster output scanner includes a laser for producing the laser beam, a pre-polygon lens for focusing that laser beam; and a rotating, multifaceted polygon for sweeping the laser beam in the scan plane. The raster output scanner further includes a facet position sensor that determines the position of the polygon facets and a scan line control mechanism for adjusting the scan line plane. The electrophotographic printer further includes a scan line position controller that receives photoreceptor position information from the photoreceptor position sensor and facet position information from the facet position sensor. The scan line position controller produces an electrical signal that drives the scan line control mechanism to adjust the scan line position such that the position of the scan line on the photoreceptor is compensated for errors in the position of the photoreceptor and for polygon facet errors.

The scan line control mechanism is beneficially comprised of a mounting frame, a large displacement piezoelectric element attached to the mounting frame, and a flexible arm assembly having a lens mount that holds the pre-polygon lens. The flexible arm assembly includes flexible arms that can flex in the predominate direction of motion of the piezoelectric element, but that are substantially rigid in another direction and that resist rotation. The flexible arm assembly is mounted such that its flexible arms and the lens mount are biased toward the piezoelectric element. Electrical signals from the scan line position controller cause the piezoelectric element to expand and contract, which, combined with the bias of the flexible arm assembly, moves the pre-polygon lens, and thus the scan line plane, to compensate for photoreceptor position errors and for polygon facet errors.

Beneficially, the principles of the present invention are used in a single pass electrophotographic printer to correct for color image misregistration.

BRIEF DESCRIPTION OF THE DRAWINGS

Other aspects of the present invention will become apparent as the following description proceeds and upon reference to.

DETAILED DESCRIPTION OF A PREFERRED EMBODIMENT OF THE INVENTION

Figure 1:
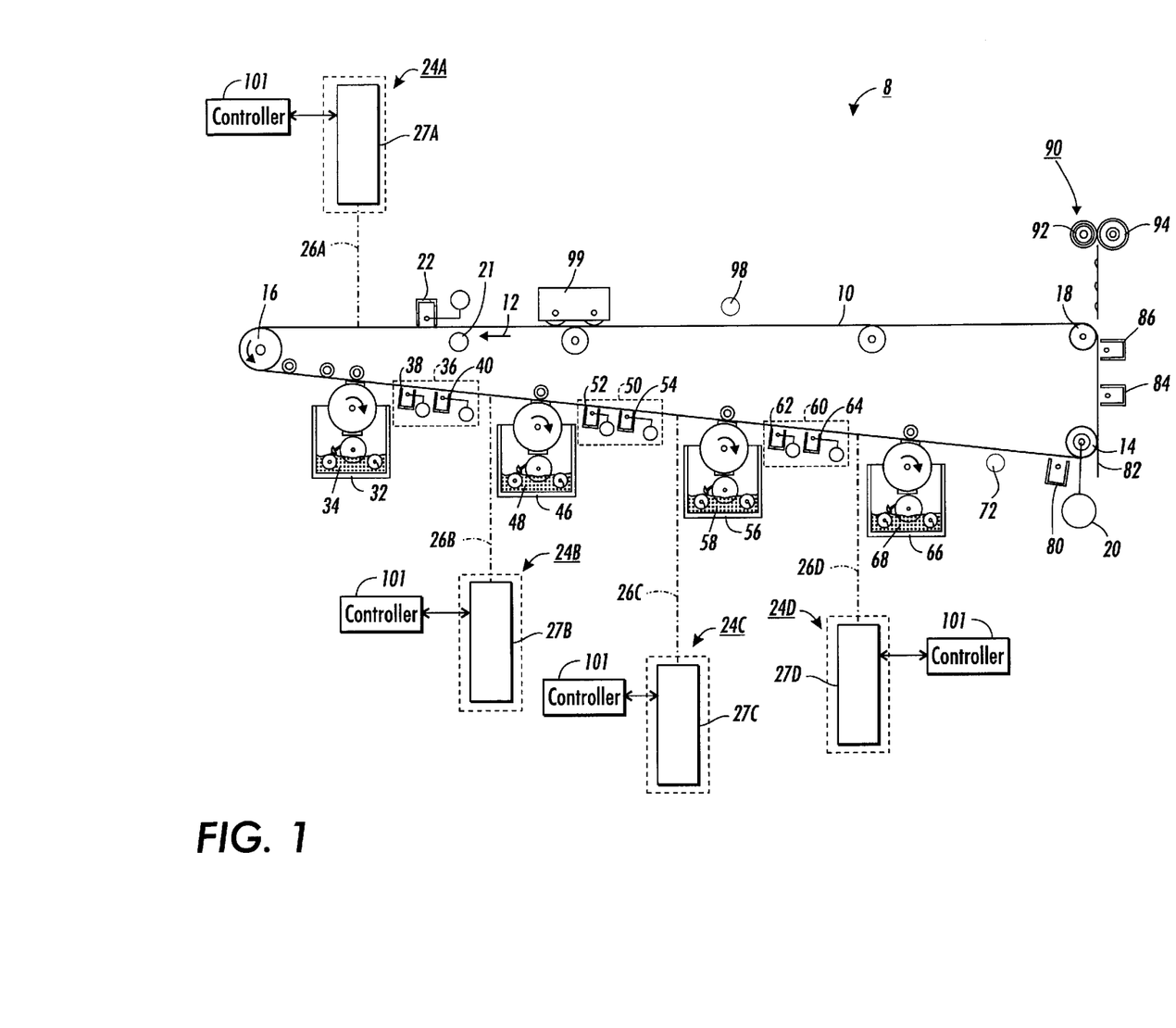
FIG. 1 shows an electrophotographic printing machine that incorporates the principles of the present invention.

FIG. 1 illustrates an electrophotographic printing machine 8 that is in accord with the principles of the present invention. The printing machine 8 is a single pass, Recharge-Expose-and-Develop, Image-on-Image (Read IOI) printer. However, it is to be understood that the present invention is applicable to many other types of systems. Therefore, it is to be understood that the following description of the printing machine 8 is only to assist the understanding of the principles of the present invention.

The printing machine 8 includes an Active Matrix (AMAT) photoreceptor belt 10 which travels in the direction indicated by the arrow 12. Belt travel is brought about by mounting the photoreceptor belt about a driven roller 14 and tension rollers 16 and 18, and then driving the driven roller 14 with a motor 20.

As the photoreceptor belt travels each part of it passes through each of the subsequently described process stations. For convenience, a single section of the photoreceptor belt, referred to as the image area, is identified. The image area is that part of the photoreceptor belt which is to receive the various actions and toner layers that produce the final composite color image. While the photoreceptor belt may have numerous image areas, since each image area is processed in the same way a description of the processing of one image area suffices to explain the operation of the printing machine 8.

The imaging process begins with the image area passing a "precharge" erase lamp 21 that illuminates the image area so as to cause any residual charge which might exist on the image area to be discharged. Such erase lamps are common in high quality systems and their use for initial erasure is well known.

As the photoreceptor belt continues its travel the image area passes a charging station comprised of a DC corotron 22. The DC corotron charges the image area in preparation for exposure to create a latent image for black toner. For example, the DC corotron might charge the image area to a substantially uniform potential of about -500 volts. It should be understood that the actual charge placed on the photoreceptor will depend upon many variables, such as the black toner mass that is to be developed and the settings of the black development station (see below).

After passing the charging station the image area advances to an exposure station 24A. At the exposure station the charged image area is exposed to a modulated laser beam 26A from a raster output scanner 27A that raster scans the image area such that an electrostatic latent representation of a black image is produced. Significantly, the modulation of the laser beam 26A is controlled such that the first scan line of the black latent image is imaged at a known position on the photoreceptor. A more detailed description of the raster output scanners used in the subject invention is given subsequently.

Still referring to FIG. 1, after passing the exposure station 24A the exposed image area with the black latent image passes a black development station 32 that advances black toner 34 onto the image area so as to develop a black toner image. While the black development station 32 could be a magnetic brush developer, a scavengeless developer may be somewhat better. One benefit of scavengeless development is that it does not disturb previously deposited toner layers. Biasing is such as to effect discharged area development (DAD) of the lower (less negative) of the two voltage levels on the image area. The charged black toner 34 adheres to the exposed areas of the image area, thereby causing the voltage of the illuminated parts of the image area to be about −200 volts. The non-illuminated parts of the image area remain at about −500 volts.

After passing the black development station 32 the image area advances to a recharging station 36 comprised of a DC corotron 38 and an AC scorotron 40. The recharging station 36 recharges the image area and its black toner layer using technique known as split recharging. Split recharging is described in U.S. Pat. No. 5,600,430, which issued on Feb. 4, 1997, and which is entitled, "Split Recharge Method and Apparatus for Color Image Formation." Briefly, the DC corotron 38 overcharges the image area to a voltage level greater than that desired when the image area is recharged, while the AC scorotron 40 reduces that voltage level to that which is desired. Split recharging serves to substantially eliminate voltage differences between toned areas and untoned areas and to reduce the level of residual charge remaining on the previously toned areas. This benefits subsequent development by different toners.

The recharged image area with its black toner layer then advances to an exposure station 24B. There, a laser beam 26B from a raster output scanner 27B exposes the image area to produce an electrostatic latent representation of a yellow image. The operation of the exposure stations is described subsequently.

The now re-exposed image area then advances to a yellow development station 46 that deposits yellow toner 48 onto the image area. After passing the yellow development station the image area advances to a recharging station 50 where a DC scorotron 52 and an AC scorotron 54 split recharge the image area.

An exposure station 24C then exposes the recharged image area. A modulated laser beam 26C from a raster output scanner 27C then exposes the image area to produce an electrostatic latent representation of a magenta image. Again, the operation of the exposure stations is described subsequently.

After passing the magenta exposure station the now re-exposed image area advances to a magenta development station 56 that deposits magenta toner 58 onto the image area. After passing the magenta development station the image area advances another recharging station 60 where a DC corotron 62 and an AC scorotron 64 split recharge the image area.

The recharged image area with its toner layers then advances to an exposure station 24D. There, a laser beam 26D from a raster output scanner 27D exposes the image area to produce an electrostatic latent representation of a cyan image. Again, the operation of the exposure stations is described in more detail subsequently.

After passing the exposure station 24D the re-exposed image area advances past a cyan development station 66 that deposits cyan toner 68 onto the image area. At this time four colors of toner are on the image area, resulting in a composite color image. However, the composite color toner image is comprised of individual toner particles that have charge potentials that vary widely. Directly transferring such a composite toner image onto a substrate would result in a degraded final image. Therefore it is beneficial to prepare the composite color toner image for transfer.

To prepare for transfer a pretransfer erase lamp 72 discharges the image area to produce a relatively low charge level on the image area. The image area then passes a pretransfer DC scorotron 80 that performs a pre-transfer charging function. The image area continues to advance in the direction 12 past the driven roller 14. A substrate 82 is then placed over the image area using a sheet feeder (which is not shown). As the image area and substrate continue their travel they pass a transfer corotron 84 that applies positive ions onto the back of the substrate 82. Those ions attract the negatively charged toner particles onto the substrate.

As the substrate continues its travel is passes a detack corotron 86. That corotron neutralizes some of the charge on the substrate to assist separation of the substrate from the photoreceptor 10. As the lip of the substrate 82 moves around the tension roller 18 the lip separates from the photoreceptor. The substrate is then directed into a fuser 90 where a heated fuser roller 92 and a pressure roller 94 create a nip through which the substrate 82 passes. The combination of pressure and heat at the nip causes the composite color toner image to fuse into the substrate. After fusing, a chute, not shown, guides the substrate to a catch tray, also not shown, for removal by an operator.

After the substrate 82 is separated from the photoreceptor belt 10 the image area continues its travel and passes a preclean erase lamp 98. That lamp neutralizes most of the charge remaining on the photoreceptor belt After passing the preclean erase lamp the residual toner and/or debris on the photoreceptor is removed at a cleaning station 99. The image area then passes once again to the precharge erase lamp 21 and the start of another printing cycle.

The printer 8 also includes a system controller 101 that controls the overall operation of the printer. The system controller preferably comprises one or more programmable microprocessors that operate in accordance with a software program stored in a suitable memory. Of particular importance to understanding the present invention is that the system controller synchronizes the operation the printer 8 and provides video information that is used to modulate the laser beams 26A–26D.

Figure 2:
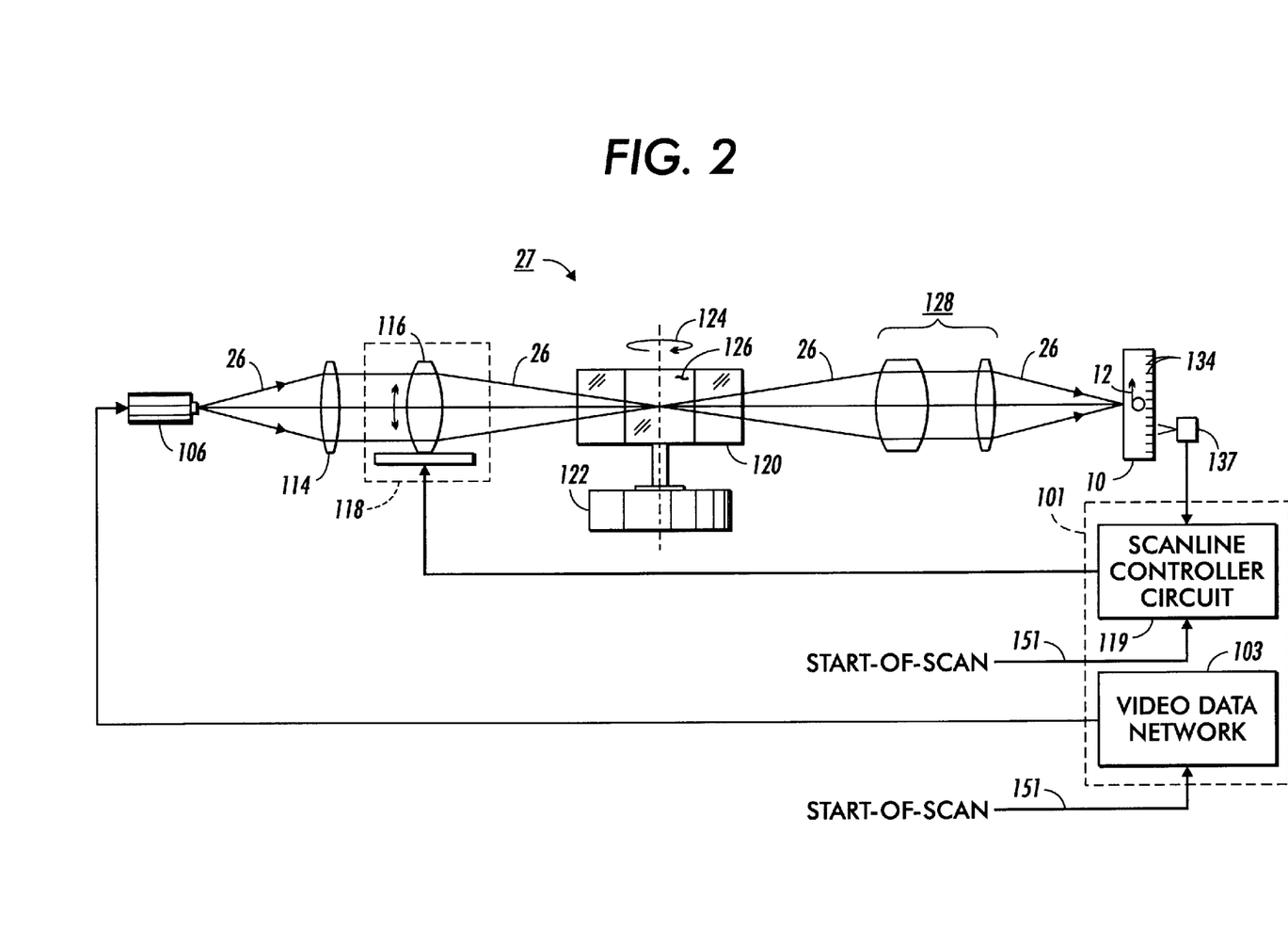
FIG. 2 shows a partial side view of an exposure station, including a raster output scanner (ROS) having a piezoelectric-actuated lens mover and a photoreceptor position sensor, as used in the electrophotographic marking machine shown in FIG. 1.
Figure 3:
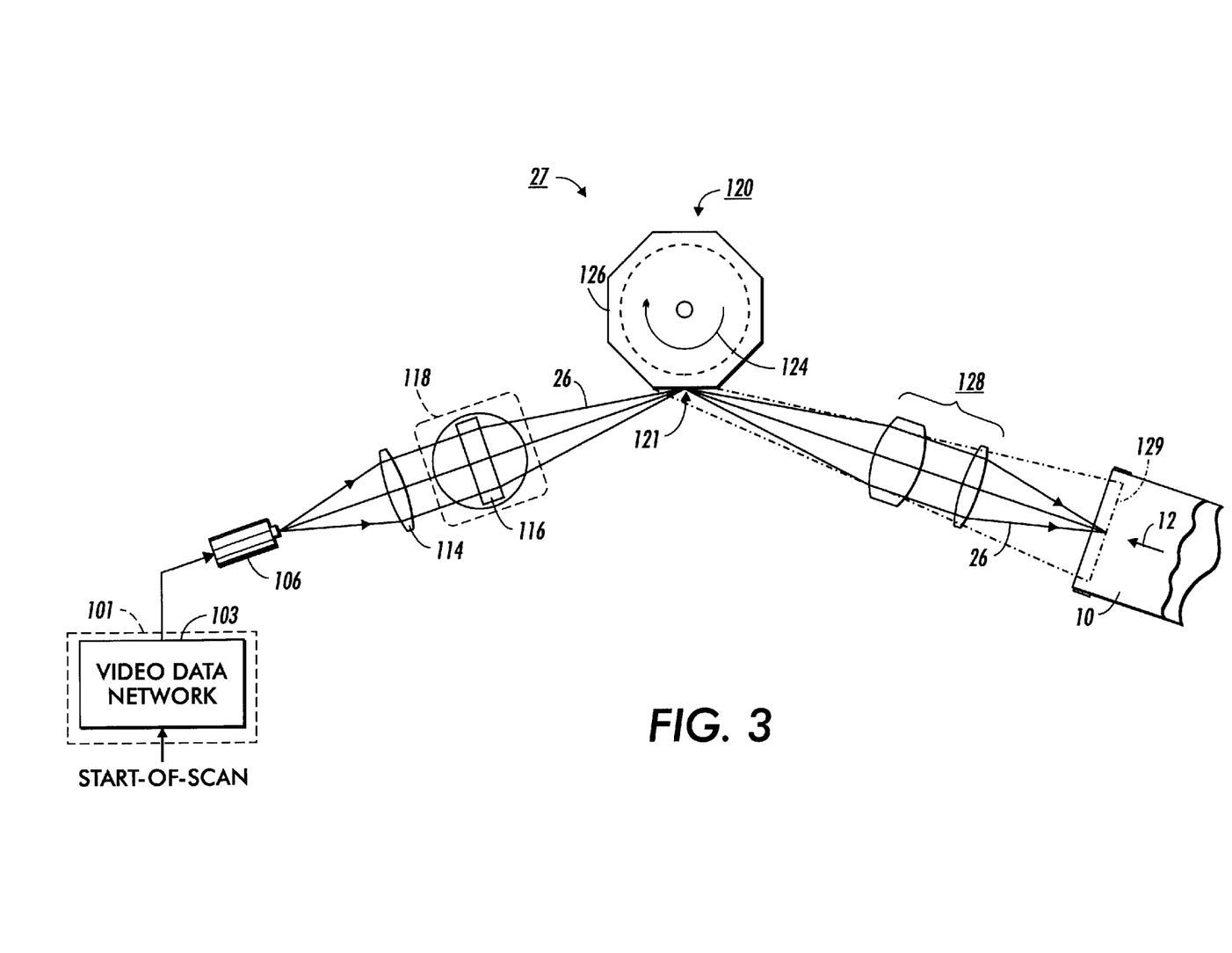
FIG. 3 shows a top view of the exposure station of FIG. 2.
Figure 4:
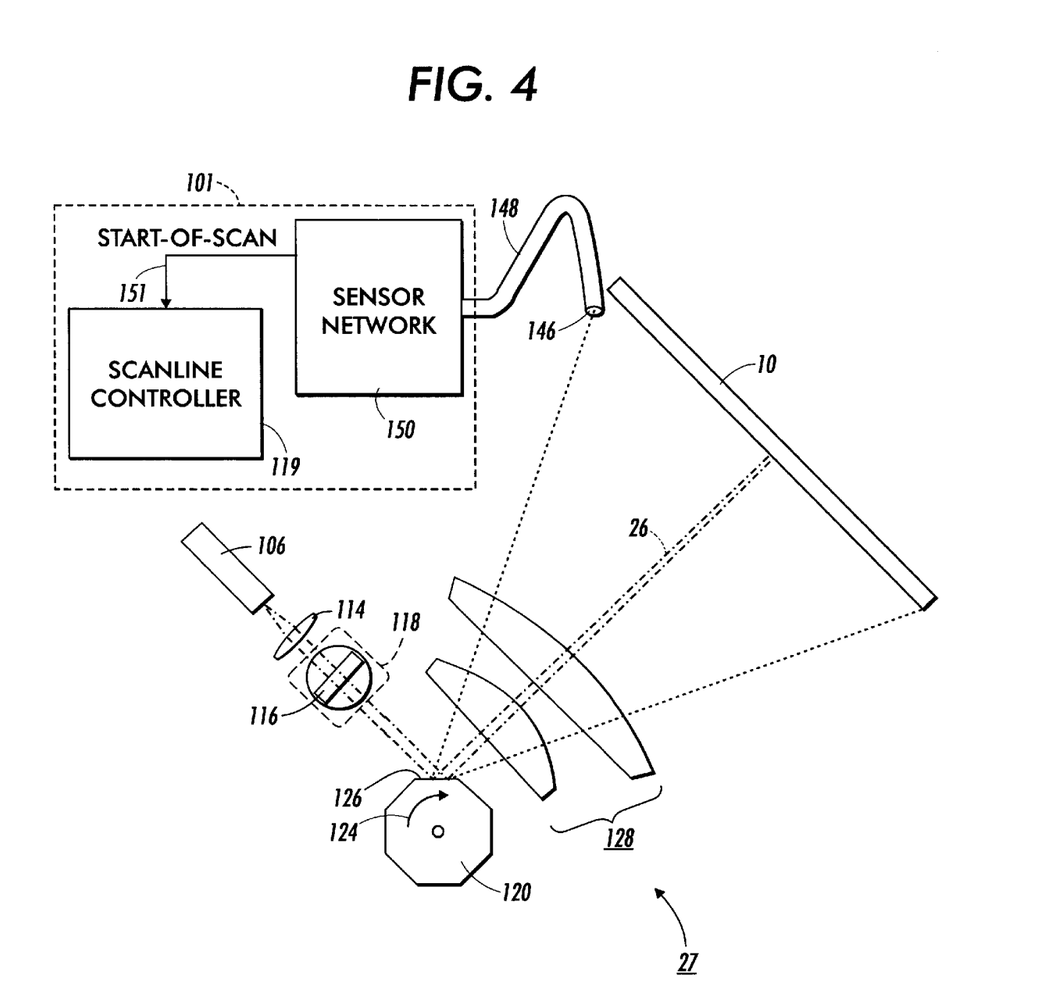
FIG. 4 illustrates a schematic view of the exposure station of FIG. 2, with particular emphasis on facet detection.

Differences between prior art printing machines and the printing machine 8 most directly relate to the configuration and operation of the raster output scanners. FIGS. 2, 3, and 4 present various views of a generic raster output scanner 27 as used in the printer 8. A video data network 103 within the controller 101 applied video data to a laser diode 106. In response the laser diode produces a laser beam 26 that is modulated according to the video data. As emitted by the laser diode the laser beam 26 is diverging. A spherical lens 114 collimates that diverging beam, which then enters a cylindrical lens 116, which focuses the beam in the slow scan (process) direction onto a polygon 120 having a plurality of mirrored facets 126. Referring now specifically to FIG. 2, a piezoelectric actuator assembly 118 moves the cylindrical lens 116 in one plane in response to signals from a scanline controller circuit 119, which is also part of the controller 101. The operation of the scanline controller circuit is described subsequently.

Referring now to FIGS. 2, 3, and 4 as required, a motor 122 rotates the polygon 120 in a direction 124. This rotation causes the facets to sweep the laser beam in a scan plane. The sweeping laser beam passes through a post-scan optics system 128 that reconfigures the beam into a circular or elliptical cross-section and that refocuses that laser beam 26 onto the surface of the photoreceptor 10. The post-scan optics also corrects for various problems such as scan non-linearity (f-theta correction) and wobble (scanner motion or facet errors). As shown most clearly in FIG. 3, the deflecting laser beam forms a scan line 129 on the photoreceptor 10.

Referring specifically to FIG. 2, the position of the cylinder lens 116 influences the slow scan (process) direction location of the spot, and thus of the scan line, on the photoreceptor 10. If the cylinder lens is moved up or down the location of the scan line is moved in the slow scan direction an amount that depends on the system's magnification. For example, in one embodiment, if the cylinder lens moves 100 microns vertically, the scan line advances (in the direction 12) on the photoreceptor by 60 microns. Position signals applied to the piezoelectric actuator assembly 118 by the scanline controller circuit 119 cause the piezoelectric actuator assembly 118 to move the cylindrical lens 116, and thus the position of the scan line 129 (see FIG. 3). The piezoelectric actuator assembly is described in more detail below. In the preferred embodiment, the position of the scan line is adjusted to compensate for photoreceptor position errors and for facet position errors.

Photoreceptor position errors are determined using a plurality of evenly paced timing marks 134 on the photoreceptor 10. A photosensor 137 senses hose timing marks and applies timing signals to the scanline controller circuit 119. Alternatively, timing signals could be generated using a shaft encoder mounted on a photoreceptor roller. In either event, the scanline controller circuit 119 electronically determines when and how much the photoreceptor's position varies from ideal (since the photoreceptor should move at a constant rate, variations from that rate produce photoreceptor position variations). The scanline controller circuit 119 then determines and applies the correct position signal to the piezoelectric actuator assembly 118 such that the cylindrical lens 116 is moved the proper amount and in the proper direction to correctly position the scan line on the photoreceptor. Thus, scan line position errors that result from photoreceptor position variations are corrected using aerial control of the scan line position. This is particularly advantageous when printing in color since by correctly positioning the scan line produced by each of the raster output scanners 27A–27D a properly registered color image can result.

Facet position errors are also compensated using aerial control of the scan line position. As mentioned in the "Background of the Invention" scan line misregistration can be a result of phasing errors. That is, the errors that result from a facet not being in the correct position to produce a scan line at the proper time. Using the principles of the present invention a particular scan line can be produced either earlier or later than ideal while the scan line position is adjusted on the photoreceptor by moving the cylindrical lens.

To determine when a facet is in position to start a scan line, each raster output scanner system includes a facet detector. There are many different types of facet detectors. For example, the motor 122 might include an optical sensor that outputs a signal at certain times of its rotation. Another example might be a Hall sensor that tracks the rotation of the polygon 120. However, the printing machine 8 uses a start of scan sensor for facet position detection.

FIG. 4 best illustrates start-of-scan sensor detection. A receiving end 146 of an optical fiber 148 is strategically placed in the scan path of the laser beam 26. The collected light flux is guided to a sensor network 150, which is a part of the controller 101. The sensor network, which includes a light sensitive element, senses the collected light flux and generates a start-of-scan signal (on a line 151). The start-of-scan signal that is applied via a line 151 to the scanline controller circuit 119 and to the video data network 103. Based upon the rate of the start-of-scan signals the scanline controller circuit 119 determines the rotational velocity of the polygon. Based upon the occurrence of the start-of-scan signals the video data network determines the proper time to apply video data to the laser diode 106.

Since the scanline controller 119 knows the position of the photoreceptor and the start-of-scan rate the scanline controller can determine how far the position of the photoreceptor will be from ideal when the facet that is to produce the next scan line creates a start-of-scan signal. Then, by applying the correct position signal to the piezoelectric actuator assembly 118 the cylindrical lens 116 is moved the proper amount and in the proper direction to correctly position the scan line on the photoreceptor.

It should clearly be understood that piezoelectric actuator assemblies can be used for purposes other then for compensating for photoreceptor motion and facet position errors. For example, piezoelectric actuator assemblies can also be used to maintain the scan line position at a fixed position despite polygon facet defects.

Figure 5:
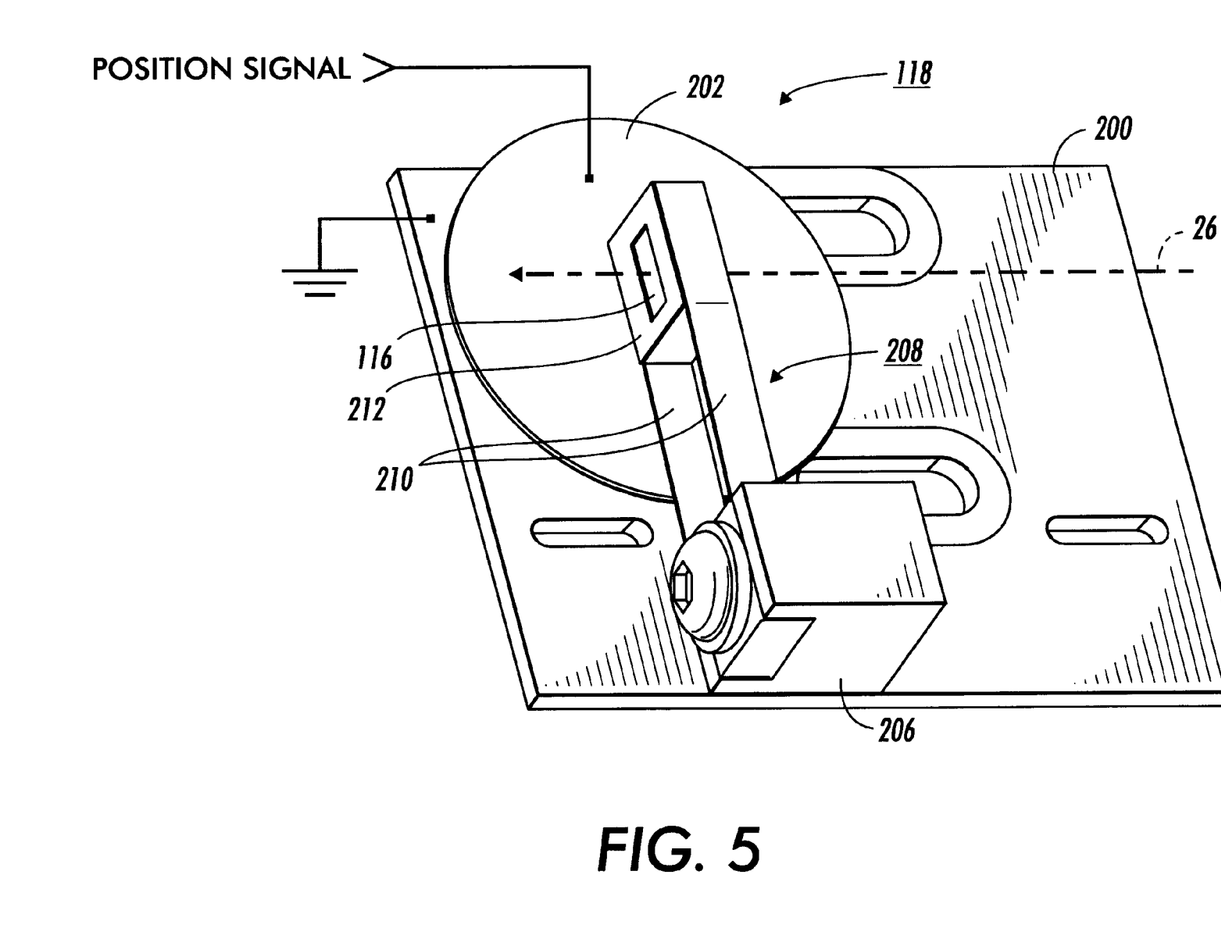
FIG. 5 illustrates a piezoelectric-actuated lens mover that is used in the raster output scanners of the electrophotographic marking machine shown in FIG. 1.

FIG. 5 illustrates a generic piezoelectric actuator assembly 118 as used in the printer 8. That assembly includes a mounting frame 200, which is beneficially used to also mount a laser diode 106. However, that is not required and FIG. 5 only shows the laser beam 26. A piezoelectric disk 202 having metal-plated surfaces is mounted on the mounting frame 200 such that the one of the metal-plated surfaces connects to the mounting frame. The mounting frame acts as an electrical ground for the piezoelectric disk (alternatively an electrical connection can be made to the piezoelectric disk using a wire). The other metal-plated surface receives via a wire the motion error signal. The position signal is applied across the piezoelectric disk so as to induce that disk to expand and contract.

One beneficial piezoelectric disk is a high displacement actuator sold as "Rainbow" by Aura Ceramics. Other options include stacking various piezoelectric disks together.

Also mounted to the mounting frame 200 is an arm mount 206. Attached to that mount is a flexible arm assembly 208. That assembly is comprised of two flexible arms 210 that are flexible in the direction that is normal to the surface of the mounting frame 200, but that are rigid in the direction that is parallel to the surface of the mounting frame. At the end of the flexible arm assembly is a lens holder 212 that holds the pre-polygon cylinder lens 116. The flexible arm assembly mounts to the arm mount 206 such that the flexible arms 210 are biased toward the piezoelectric disk 202. The rigidity of the flexible arms maintains the cylindrical lens at the proper focal position relative to the laser diode 30. Futhermore, the flexibility of the flexible arms enables the piezoelectric element to control the spot position in the slow scan (process) direction without rotating or otherwise perturbing the cylinder lens in an undesirable direction. Fundamental mechanical properties of dual flexure arms allow this motion while minimizing undesired motion of the cylinder lens, including rotation about and translation along the axis formed by the laser beam path or the axis which defines the cylinder lens curved surface.

Figure 6:
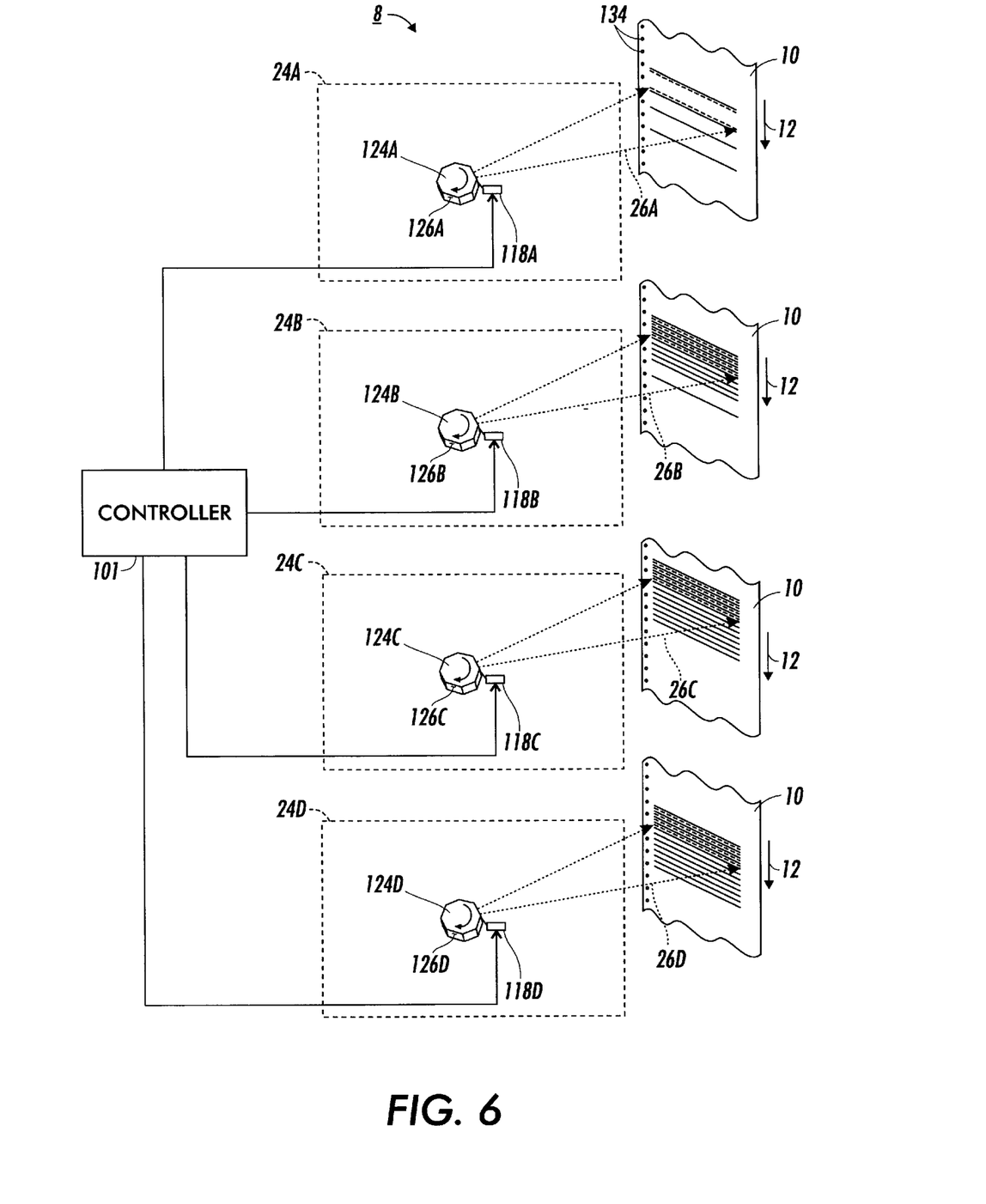
FIG. 6 illustrates multiple raster output scanners in operation raster scanning a photoreceptor to produce a composite color image.

The printer 8 incorporates aerial control of the scan line position. This is highly advantageous in a color printer since the registration of the individual latent images is simplified. FIG. 6 illustrates such registration. As explained above, raster output scanner 24A produces a first latent image on the photoreceptor 10. When the photoreceptor 10 advances in the direction 12 the image area passes the raster output scanner 24B. The controller 101 controls the piezoelectric actuator assembly 118B such that the second latent image is properly registered with the first latent image despite facet position errors and photoreceptor position errors. As the photoreceptor 10 continues to advance the controller 101 controls the other piezoelectric actuator assemblies such that proper registration is achieved.

It is to be understood that while the figures and the above description illustrate the present invention, they are exemplary only. For example, instead of negatively biasing the photoreceptor, a positively biased photoreceptor might be used. Others who are skilled in the applicable arts will recognize numerous modifications and adaptations of the illustrated embodiments that remain within the principles of the present invention. Therefore, the present invention is to be limited only by the appended claims.

What is claimed:

1. A laser printer, comprising:

a charged photoreceptor moving in a process direction;

a controller producing video data signals;

a raster output scanner receiving said video data signals, said raster output scanner for exposing said charged photoreceptor such that a latent image representation of said video data signals is produced on said photoreceptor, said raster output scanner including:

a laser source producing a laser beam that is modulated in accordance with said video data signals;

a pre-polygon lens receiving and focusing said modulated laser beam;

a rotating polygon having a plurality of facets for reflecting said focused laser beam as a scan line on said photoreceptor so as to produce a plurality of output scan lines;

a facet position sensor for sensing the position of said facets of said polygon;

a piezoelectric-actuated lens mover assembly disposed between said laser source and said rotating polygon, said piezoelectric-actuated lens mover holding said pre-polygon lens and moving said pre-polygon lens in response to a position signal; and a scanline controller receiving information from said facet position sensor, said scan line position controller for producing said position signal such that said piezoelectric-actuated lens mover assembly moves said pre-polygon lens such that a position of said scan line on said photoreceptor is corrected for facet position errors.

2. A laser printer according to claim 1, further including a photoreceptor position sensor for sensing the position of the photoreceptor; wherein said scanline controller produces said position signal such that said piezoelectric-actuated lens mover assembly moves said pre-polygon lens to correct for photoreceptor position errors.

3. A laser printer according to claim 1, wherein said position signal causes said piezoelectric element to expand or contract such that said pre-polygon lens moves.

4. A laser printer according to claim 2, wherein said photoreceptor position sensor senses a plurality of timing marks on said photoreceptor.

5. A laser printer according to claim 1, wherein said facet position sensor electrical signal produces a start-of-scan signal.

6. A laser printer according to claim 1, wherein said pre-polygon lens is a cylinder lens.

7. A laser printer according to claim 1, wherein said piezoelectric-actuated lens mover assembly includes:

a mounting frame;

a piezoelectric element connected to said mounting frame;

a flexible arm assembly operatively connected to said mounting frame and having at least two flexible arms and a lens mount, wherein said flexible arms can flex in a direction of motion of the piezoelectric element, wherein said flexible arms are substantially rigid in another direction, and wherein said flexible arm assembly is mounted such that said flexible arms are biased toward said piezoelectric element; and a pre-polygon lens attached to said lens mount.

8. The laser printer according to claim 7, wherein said position signal is applied to said piezoelectric element.

9. A raster output scanner according to claim 8, wherein said flexible arms can flex in a direction that is substantially perpendicular to said laser beam.

10. A raster output scanner according to claim 9, wherein said flexible arms are substantially rigid in a direction that is substantially parallel to said laser beam.

11. A color laser printer, comprising:

a charged photoreceptor moving in a process direction;

a controller producing a first set of video data signals that represent a first latent image and a second set of video data signals that represent a second latent image;

a position sensor for sensing the position of said photoreceptor a first raster output scanner receiving said first set of video data signals, said first raster output scanner exposing said charged photoreceptor such that a first latent image is produced on said photoreceptor;

a second raster output scanner receiving said second set of video data signals, said second raster output scanner for exposing said charged photoreceptor such that a second latent image is produced on said photoreceptor, said second raster output scanner including:

a laser source producing a laser beam that is modulated in accordance with said second set of video data signals;

a pre-polygon lens receiving and focusing said modulated laser beam;

a rotating polygon having a plurality of facets for reflecting said modulated laser beam as a scan line on said photoreceptor so as to produce said second latent image;

a facet position sensor for sensing the position of said facets of said rotating polygon;

a piezoelectric-actuated lens mover assembly disposed between said laser source and said rotating polygon, said piezoelectric-actuated lens mover holding said pre-polygon lens and moving said pre-polygon lens in response to a position signal; and a scanline controller receiving information from said facet position sensor and from said position sensor, said scan line position controller for producing said position signal such that said piezoelectric-actuated lens mover assembly moves said pre-polygon lens such that second latent image is registered with said first latent image.

12. A color laser printer according to claim 11, wherein said position sensor senses a plurality of timing marks on said photoreceptor.

13. A color laser printer according to claim 11, wherein said position signal causes said piezoelectric element to expand or contract such that said pre-polygon lens moves.

14. A color laser printer according to claim 11, wherein said facet position sensor electrical signal produces a start-of-scan signal.

15. A color laser printer according to claim 14, wherein said pre-polygon lens is a cylinder lens.

16. A laser printer according to claim 11, wherein said piezoelectric-actuated lens mover assembly includes:

a mounting frame;

a piezoelectric element connected to said mounting frame;

a flexible arm assembly operatively connected to said mounting frame and having at least two flexible arms and a lens mount, wherein said flexible arms can flex in a direction of motion of the piezoelectric element, wherein said flexible arms are substantially rigid in another direction, and wherein said flexible arm assembly is mounted such that said flexible arms are biased toward said piezoelectric element; and a pre-polygon lens attached to said lens mount.

17. The laser printer according to claim 16, wherein said position signal is applied to said piezoelectric element.

18. A raster output scanner according to claim 17, wherein said flexible arms can flex in a direction that is substantially perpendicular to said laser beam.

19. A raster output scanner according to claim 18, wherein said flexible arms are substantially rigid in a direction that is substantially parallel to said laser beam.

* * * * *